United States Patent
Bosse et al.

(10) Patent No.: US 8,777,269 B2
(45) Date of Patent: Jul. 15, 2014

(54) SELF-LOCKING BELT RETRACTOR

(75) Inventors: Uwe Bosse, Hamburg (DE); Volkmar Heine, Hamburg (DE); Klaus Werner Butenop, Herzhorn (DE)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 13/825,383

(22) PCT Filed: Sep. 10, 2011

(86) PCT No.: PCT/EP2011/004564
§ 371 (c)(1),
(2), (4) Date: Mar. 21, 2013

(87) PCT Pub. No.: WO2012/041443
PCT Pub. Date: Apr. 5, 2012

(65) Prior Publication Data
US 2013/0181430 A1    Jul. 18, 2013

(30) Foreign Application Priority Data

Sep. 30, 2010  (DE) .......................... 10 2010 046 980

(51) Int. Cl.
*B60R 22/38* (2006.01)
*B60R 22/34* (2006.01)

(52) U.S. Cl.
CPC .............. *B60R 22/38* (2013.01); *B60R 22/341* (2013.01)
USPC ..... 280/807; 242/379.1; 242/382; 242/382.5; 242/383.4

(58) Field of Classification Search
CPC ........ B60R 22/34; B60R 22/38; B60R 22/341
USPC .................. 280/807; 242/379.1, 379.22, 382, 242/382.5, 383.4
See application file for complete search history.

(56) References Cited

U.S. PATENT DOCUMENTS 3,883,089 A * 5/1975 Close ......................... 242/383.1
4,285,478 A * 8/1981 Stamboulian ................. 242/379
(Continued)

FOREIGN PATENT DOCUMENTS

| DE | 24 50 139 | 4/1975 |
| DE | 3403568 A1 | 8/1985 |
| DE | 299 24 575 U1 | 1/2004 |
| DE | 103 24 195 B4 | 12/2008 |

OTHER PUBLICATIONS

Klaus Butenop, Self-locking safety-belt reeling device, Aug. 8, 1985, German Patent Office, DE 34 03 568 A1, Machine translation of Description.*
PCT International Search Report—Jan. 20, 2012.
(Continued)

*Primary Examiner* — James English
(74) *Attorney, Agent, or Firm* — Brinks Gilson & Lione

(57) ABSTRACT

A self-locking belt retractor with a belt shaft which is mounted rotatably in a frame having a belt-sensitive a blocking device. A disc cam (1) mounted rotatably on the belt shaft, is pretensioned by a spring in the extension direction of the seat belt and on which an inertial mass (5) is mounted pivotably about a pivot axis (S). A projection (11) limits relative movement between the inertial mass (5) and the disc cam (1) is provided on the inertial mass (5) and/or on the disc cam (1).

9 Claims, 3 Drawing Sheets

(56) References Cited

U.S. PATENT DOCUMENTS

| | | | |
|---|---|---|---|
| 4,619,418 A * | 10/1986 | Butenop | 242/382.6 |
| 5,014,926 A * | 5/1991 | Rumpf et al. | 242/383.4 |
| 5,487,515 A * | 1/1996 | Hishon et al. | 242/383.4 |
| 5,544,838 A * | 8/1996 | Boelstler et al. | 242/384.2 |
| 5,794,877 A * | 8/1998 | Ono et al. | 242/379.1 |
| 6,592,064 B2 * | 7/2003 | Clute et al. | 242/379.1 |
| 2011/0309178 A1 * | 12/2011 | Yanagawa et al. | 242/374 |
| 2012/0175451 A1 * | 7/2012 | Yanagawa et al. | 242/379.1 |
| 2013/0264408 A1 * | 10/2013 | Maekubo et al. | 242/379.1 |

OTHER PUBLICATIONS

German Examination Report—Aug. 2, 2011.

* cited by examiner

SELF-LOCKING BELT RETRACTOR

CROSS REFERENCE TO RELATED APPLICATIONS

This application claims priority to German Patent Application No. 10 201 0 046 980.7, filed Sep. 30, 2010 and PCT/EP2011/004564, filed Sep. 10, 2011.

FIELD OF THE INVENTION

The invention relates to a self-locking seat belt retractor for a motor vehicle occupant restraint system.

BACKGROUND OF THE INVENTION

Self-locking seat belt retractors are generally used in safety belt devices of vehicles in order to roll up a non-emplaced safety belt in a park position and to enable a variable pull-out of the safety belt when it is deployed for restraining an occupant with as little slack as possible. For that purpose, a belt shaft mounted so as to rotate in the seat belt retractor and spring-tensioned in the roll-up (retraction) direction is provided on which the safety belt can be rolled up. In addition, the seat belt retractor may features a blocking (locking) mechanism which is activated when a predetermined extension acceleration of the safety belt (belt-sensitive locking) and/or or of the vehicle (vehicle sensitive locking) is exceeded, so that the belt shaft is blocked at the end in the direction of extension. In a belt-sensitive mechanism, the type of the present invention includes a blocking catch mounted on the belt shaft whose movement is controlled by a disc cam mounted on the belt shaft in a rotational manner. The disc cam itself is spring-tensioned in the belt extension direction of the belt shaft and therefore rotates below the predetermined extension acceleration of the safety belt with the belt shaft. Furthermore, an inertial mass is mounted on the disc cam so as to pivot, and when the predetermined belt extension acceleration is exceeded, said mass is held back and thereby guided into a gearing of the seat belt retractor fixed to the frame and brings the disc cam to a stop against the belt shaft. The blocking mechanism is again activated by the stoppage of the disc cam, in that the blocking catch mounted on the belt shaft executes a guide movement in a gearing fixed to the frame, said movement caused by a guide in a control contour on the disc cam.

The inertial mass must have a certain magnitude because of its above stated mission, since otherwise upon exceeding an extension acceleration it does not stop against the belt shaft. In addition, the inertial mass must be movably mounted on the disc cam rotating with the belt shaft in such a manner that a relative movement with respect to the disc cam must be able to be executed for the control of the blocking device. Because of the mass of the inertial mass and its movable mounting, vibrations acting on the seat belt retractor can result in undesirable noise generated because of the inertial mass.

The object of the invention therefore is to create a self-locking seat belt retractor with a belt-sensitive blocking device having a control sensitive to the belt-strap due to an inertial mass movably mounted on a disc cam which features a reduced generation of noise during vibrations.

To achieve the object the invention proposes a self-locking seat belt retractor with the characteristics of the devices described herein. Other preferred embodiments of the invention can be found in the associated description.

SUMMARY OF THE INVENTION

The invention proposes that a projection is provided on the inertial mass and/or on the disc cam limiting the relative movement between the inertial mass and the disc cam directed perpendicular to the pivot movement of the inertial mass. By means of the proposed solution, the perpendicularly aligned potential movement of the inertial mass, which is the cause of the generated noise, can be specifically limited without the movement of the inertial mass to control the blocking device being disadvantageously limited by the placement of the projection.

It is further proposed that the inertial mass to control the blocking device pivots from a first position to a second position and the projection is so positioned that it limits the relative movement between the inertial mass and the disc cam in the first position of the inertial mass. The generation of noise is especially reduced to a significant extent by the proposed arrangement of the projection, since during normal operation with the safety belt emplaced (worn), the inertial mass is basically located initially in the first position, so that the limitation of the potential movement of the inertial mass in this position is especially effective with respect to noise reduction.

It is further proposed that a second projection is provided on the disc cam and/or the inertial mass such that the inertial mass and the disc cam move in line next to each other in a second position of the inertial mass controlling the blocking device perpendicular to the pivot movement of the inertial mass. Noise generation can be also reduced in the second position of the inertial mass controlling the blocking device by the envisioned second projection.

It is also proposed that the projection(s) feature(s) two contact areas limiting the relative movement of the inertial mass on both sides. The freedom of movement of the inertial mass and thus the generation of noise can be further reduced by the contact areas which limit the relative movement of the inertial mass on both sides.

The projection(s) can be formed in this case in an especially simple manner by an L-shaped finger placed on the disc cam. By the shape of the projection(s) surrounding the inertial mass in an L-shape, they can be constructively produced very simply as a molded section of the disc cam which already exhibits both contact areas limiting the movement of the inertial mass.

It is also proposed that the L-shaped finger is so positioned that the covering of the L-shaped finger with the inertial mass during the pivot movement of the inertial mass continually increases and decreases depending on the direction of the pivot movement. The inertial mass is in practice moved in and out of the free-space of the L-shaped finger, whereby the limitation of the freedom of movement to be achieved by the invention thereby also continually decreases and increases.

In addition, it is proposed that the projection and/or the inertial mass features a ramp-like contact area across which the inertial mass and the disc cam move in line next to each other. The separation and thus the freedom of movement of the inertial mass perpendicular to the pivot movement is continually reduced by means of the proposed ramp-shaped contact area. Thus the inertial mass moves across the ramp-shaped contact area to the disc cam without its movement being impeded by frictional forces.

It is likewise proposed that the inertial mass be pivot-mounted on the disc cam so as to pivot around a rotation point and exhibit on its free end an engaging tip to engage in a fixed gearing of the seat belt retractor, and the projection is so positioned that it limits the transverse movement of the inertial mass at a second, opposite end of the inertial mass in relation to the rotation point. The movement of the inertial mass is thereby consciously not restricted to the end which exhibits the engaging tip, but rather to the opposite end in relation to the rotation point. This opposite end can be formed specifically to rest against the projection without thereby limiting the engaging function.

Another preferred embodiment of the invention can be seen in that the projection is so positioned that the transverse movement of the inertial mass to the disc cam is limited at a radially outer section of the inertial mass. The proposed arrangement of the projection facilitates a limitation of the transverse movement with a large lever arm, if possible, by means of which a very stable support of the inertial mass can be realized.

BRIEF DESCRIPTION OF THE DRAWINGS

In the following section the invention will be explained in more detail using a preferred example. Shown thereby are.

DETAILED DESCRIPTION OF THE INVENTION

Figure 1:
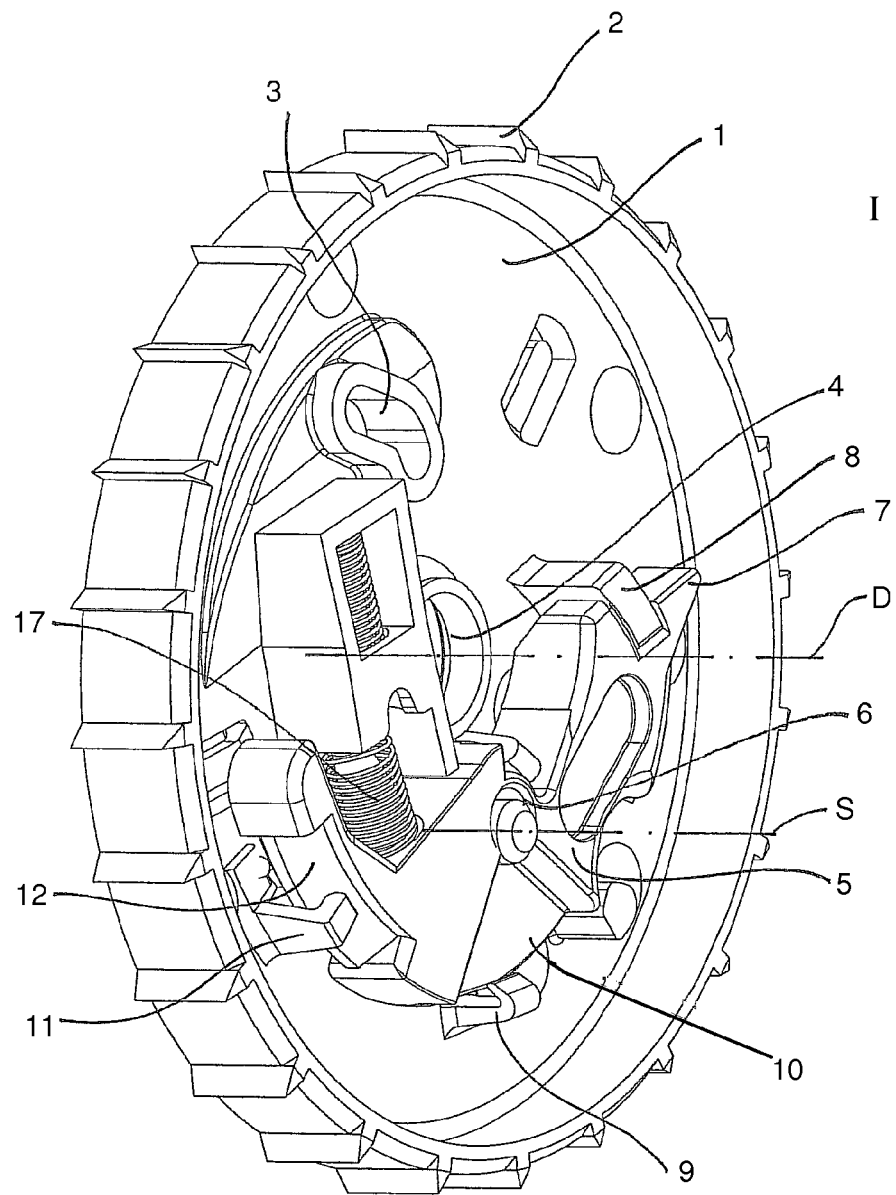
FIG. 1 shows a disc cam with an inertial mass in the first position not controlling the blocking device.

FIG. 1 presents a disc cam 1 which is rotatably mounted in a mount 4 and rotates around a rotation axis D on a belt shaft (not depicted) of a seat belt retractor and is spring-tensioned opposite it in the extension direction of a safety belt coiled on the belt shaft. A bean-shaped control recess 3 is provided on the disc cam 1 and the control pin of a blocking catch mounted on the belt shaft engages therein. The blocking catch forms a blocking device which guides into a gearing affixed to the belt retractor to block the belt shaft in the direction of extension of the safety belt. The control of the blocking catch is thereby affected by a stopping of the disc cam 1 with respect to the belt shaft, whereby the movement of the blocking catch is caused by the control pin engaging in the bean-shaped control recess 3. The belt shaft, the blocking catch, the frame, and other parts of the belt retractor are intentionally not depicted for a better overall comprehension. Since they are not changed by the invention, they can be considered as prior art, as known for example from DE10324195B4 and DE29924575. The disc cam 1 also exhibits an external gearing 2 which is provided to engage a likewise not depicted, vehicle sensitive, controlled blocking lever.

A pin is provided on the disc cam 1 that forms a rotation point 6 on which an inertial mass 5 is mounted so as to pivot around pivot axis S. The inertial mass 5 is spring-tensioned via a spring-mechanism 17 into a first position I depicted in FIG. 1 in which the inertial mass 5 rests on a stop 8. The pin is thereby so aligned that the pivot axis S of the inertial mass 5 is aligned parallel to the rotation axis D of the disc cam 1 and the (not depicted) belt shaft. When a predetermined extension acceleration of the safety belt is exceeded, the inertial mass 5 is slowed with respect to the disc cam 1 and pivots against the spring force of the spring mechanism 17 into the second position II shown in FIG. 2, and thereby engages with an engaging tip 7 into a (not depicted) gearing fixed to the seat belt retractor and then holds the disc cam 1 against the belt shaft, whereupon the blocking device is again controlled.

Figure 3:
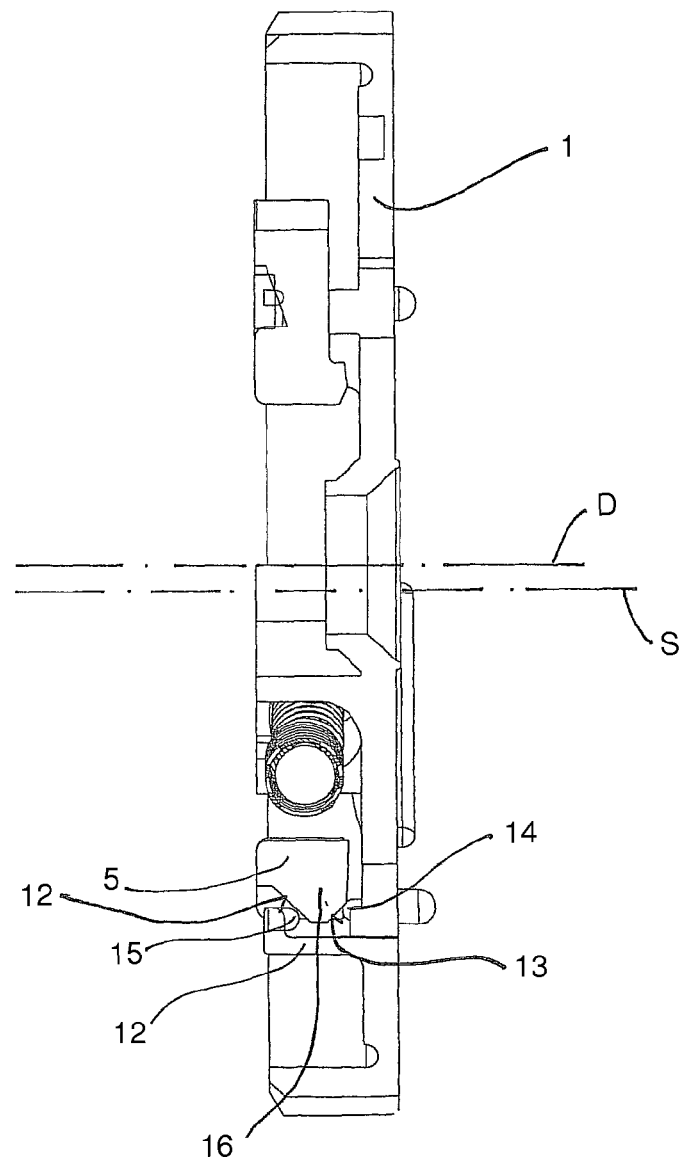
FIG. 3 shows a disc cam with an inertial mass, shown in cross-section through a projection limiting the relative movement between the inertial mass and the disc cam.

To reduce the noise development by the inertial mass 5 a projection 11 in the form of a L-shaped finger is provided which engages the inertial mass 5 in the first position I in a radially outer section 16 lying opposite the engaging tip 7 in relation to the pivot point 6, as can be recognized in the cross-sectional view in FIG. 3. Two contact areas 14 and 15 positioned on both sides of section 16 are created by the projection 11 on which the inertial mass 5 comes to rest with the mass section 16 forming two ramp-shaped contact areas 12 and 13 positioned on both sides. The relative movement between the inertial mass 5 and the disc cam 1 parallel to the pivot axis S or perpendicular to the pivot movement of the inertial mass 5 is limited by the arrangement of the contact areas 12 and 13 of the inertial mass 5 on the contact areas 14 and 15 of the projection 11, so that the noise generated by the movement of the inertial mass 5 relative to the disc cam 1 is reduced when the mass 5 is in position I.

Figure 2:
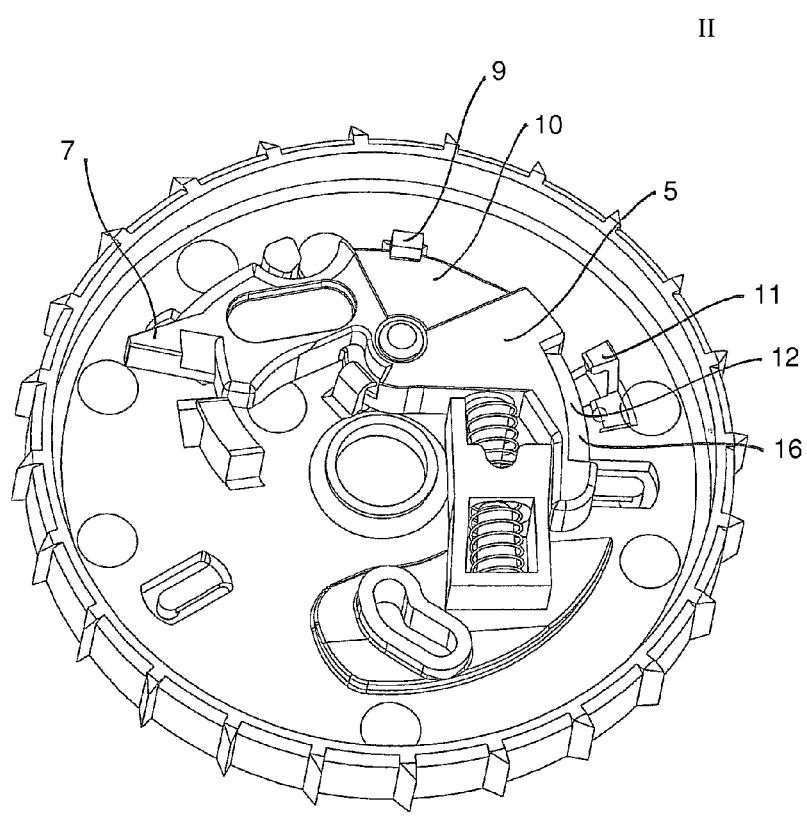
FIG. 2 shows a disc cam with an inertial mass in the second position controlling the blocking device.

When pivoting the inertial mass 5 into the second position II shown in FIG. 2, section 16 of the inertial mass 5 is moved out of the spacing of projection 11 between contact areas 14 and 15 and simultaneously guided with a second radial outer section 10 into the spacing of a second projection 9 also formed by an L-shaped finger. The projection 9 limits the relative movement of the inertial mass 5 to the disc cam 1 in the second position II of the inertial mass 5 in the same way as the projection 11 in the first position I and consequently reduces the noise generated thereby. In the ideal case, the movements of the mass 5 out of engagement with projection 11 and into engagement with projection 9 overlap, so that the relative movement of the inertial mass 5 to the disc cam 1 aligned perpendicular to the pivot movement is limited at any time of the pivot movement by at least one of the projections 11 or 9.

The contact areas 12 and 13 on section 16 of the inertial mass 5 are constructed in a ramp shape, so that section 16 is practically constructed in a wedge shape and thereby prevents the inertial mass 5 from hanging up on the projection 11 and not pivoting completely into the first position I.

While the above description constitutes the preferred embodiment of the present invention, it will be appreciated that the invention is susceptible to modification, variation and change without departing from the proper scope and fair meaning of the accompanying claims.

The invention claimed is:

1. A self-locking seat belt retractor for a motor vehicle safety belt comprising a belt shaft pivot-mounted in a frame, onto which a safety belt can be wound, a locking device locking the belt shaft when a predetermined extraction acceleration of the safety belt in the direction of extraction of the safety belt is exceeded, a control disc (1) pivot-mounted on the belt shaft and spring-pretensioned in the direction of extraction of the safety belt, and on which an inertia mass (5) mounted for swivel motion around a swivel axis (S) which is parallel to the rotational axis (D) of the belt shaft, the control disc (1) forming a projection (11) restricting the relative transverse movement between the inertia mass (5) and the control disc (1), which is directed transversely to the plane of the swivel motion of the inertia mass (5), the projection (9,11) forming two contact surfaces (14,15) restricting the relative transverse movement of the inertia mass (5) on two axially opposed sides of the inertial mass.

2. The self-locking seat belt retractor according to claim 1, wherein the inertia mass (5) swivel motion occurs from a first position (I) to a second position (II) for actuating the locking device, and that the projection (11) restricts the relative transverse movement between the inertia mass (5) and the control disc (1) in the first position (I) of the inertia mass (5).

3. The Self-locking seat belt retractor according to claim 2, wherein the projection is a first projection and on the control disc (1) or on the inertia mass (5) a second projection (9) is provided, via which the inertia mass (5) and the control disc (1) rests against each other transversely to the plane of the swivel motion of the inertia mass (5) in the second position (II) of the inertia mass (5) actuating the locking device.

4. The self-locking seat belt retractor according to claim 1 wherein the projection is formed by an L-shaped finger located on the control disc (1).

5. The self-locking seat belt retractor according to claim 4, wherein the L-shaped finger is located in such a way that the overlap of the L-shaped finger with the inertia mass (5) increases or decreases continuously during the swivel motion of the inertia mass (5) depending on the direction of the swivel motion.

6. The self-locking seat belt retractor according to claim 1, wherein the projection (9,11) forms a ramp-like contact surface (12,13), via which the inertia mass (5) and the control disc (1) rest against each other.

7. The self-locking seat belt retractor according to claim 1, wherein the inertia mass (5) is mounted for the swivel motion around a point of rotation (6) on the swivel axis and on the control disc (1), and at a free end forming an engagement point (7) for engaging into a fixed toothing of the seat belt retractor, and that the projection (11) is located in such a way that it restricts the transverse motion of the inertia mass (5) at a second portion (16) of the inertia mass (5) which is located on the opposite side of the inertial mass in relation to the point of rotation (6).

8. The self-locking seat belt retractor according to claim 1, wherein the projection is located in such a way that it restricts the transverse motion of the inertia mass (5) relative to the control disc (1) at a radial outer portion (10,16) of the inertia mass (5).

9. The self-locking seat belt retractor according to claim 2, wherein the projection is a first projection for controlling the relative transverse movement when the inertial mass and the control disc are in the first position, and a second projection controlling the relative transverse movement when the inertial mass and the control disc are in the second position, the first and second projections formed by the control disc.

\* \* \* \* \*